United States Patent [19]

Spector

[11] Patent Number: 4,470,523

[45] Date of Patent: Sep. 11, 1984

[54] LIQUID SOAP DISPENSER AND ADHESIVE WALL MOUNTING ASSEMBLY

[76] Inventor: Donald Spector, 360 Mountain Rd., Union City, N.J. 07087

[21] Appl. No.: 292,146

[22] Filed: Aug. 12, 1981

Related U.S. Application Data

[63] Continuation-in-part of Ser. No. 107,625, Dec. 27, 1979, Pat. No. 4,309,022, which is a continuation-in-part of Ser. No. 037,047, May 8, 1979, Pat. No. 4,266,369.

[51] Int. Cl.³ ............................................. B67D 5/06
[52] U.S. Cl. ................................ 222/181; 248/205.3; 156/314; 428/40
[58] Field of Search ............... 222/181, 185, 206, 212, 222/180, 173; 248/205.3; 224/901; 156/313, 71, 314, 315; 428/40, 354, 355

[56] References Cited

U.S. PATENT DOCUMENTS

| 3,078,016 | 2/1963 | Judy | 222/181 |
|---|---|---|---|
| 3,241,795 | 3/1966 | Frye | 248/467 |
| 3,257,077 | 6/1966 | Corning | 248/205.3 |
| 3,261,126 | 7/1966 | Marks | 428/40 X |
| 3,311,338 | 3/1967 | Culley | 248/205.3 |
| 3,350,045 | 10/1967 | Mayers | 248/205.3 |
| 3,718,238 | 2/1973 | Hazard et al. | 222/536 |
| 3,856,249 | 12/1974 | Frye | 248/205.3 |
| 4,273,816 | 6/1981 | Tollette | 428/40 X |
| 4,358,489 | 11/1982 | Green | 428/40 X |

Primary Examiner—Joseph J. Rolla
Attorney, Agent, or Firm—Michael Ebert

[57] ABSTRACT

A liquid soap dispenser whose container is formed of flexible plastic material and is provided with a flat rear wall and an externally-threaded nipple projecting from the front wall adjacent the base. The nipple has a cap screwed thereon which incorporates a pivoted spigot that when folded in seals the nipple and when folded out creates an outlet from which liquid soap is discharged when the front wall is pressed. Secured to the rear wall is a pad whose outer surface has a layer of pressure-sensitive adhesive thereon. Also provided is a base sheet whose area is greater than that of the pad, the sheet having a pressure-sensitive adhesive coating on its underface, making it possible to adhere and conform the sheet to a selected wall site, after which the container pad is pressed against the central zone of the sheet to securely anchor the dispenser on the wall.

5 Claims, 4 Drawing Figures

LIQUID SOAP DISPENSER AND ADHESIVE WALL MOUNTING ASSEMBLY

RELATED APPLICATIONS

This application is a continuation-in-part of my co-pending application Ser. No. 107,625, filed 12/27/79, now U.S. Pat. No. 4,309,022, which in turn is a continuation-in-part of my original application Ser. No. 037,047, filed 5/8/79, now U.S. Pat. No. 4,266,369 the entire disclosures of these applications being incorporated herein by reference.

BACKGROUND OF INVENTION

This invention relates generally to adhesive wall mountings, and more particularly to a liquid soap dispenser adhesively mountable on a wall.

In recent years, liquid soaps have become increasingly popular, soaps in this flowable form replacing conventional solid bar soaps. The practical drawback of soap bars is that they must be stored in a tray or an appropriate kitchen or bathroom soap holder; and to be put to use, the bar must first be massaged with water to produce a lather. After use the soap bar must be returned in the wet state to its holder. This procedure is not only bothersome, but the wet and softened soap bar tends to create a mess in the holder.

The advantage of liquid soap is that it is ready for immediate use; and since it is usually stored in a pump-type dispenser, when one wishes to obtain a charge of liquid soap, it is then only necessary to depress the pump actuator. With a soap bar, as the size of the bar diminishes, the bar becomes more difficult to handle. Hence bars are often discarded in a partly consumed state; whereas there is little waste with a liquid soap dispenser.

The problem with a pump-type liquid soap dispenser is that of placement. The typical kitchen sink includes a ledge depression to receive a soap bar. But if use is made of a liquid soap dispenser, it must be placed on an already crowded counter adjacent to the sink. In the case of a bath tub, the typical bathroom includes a small alcove just above the tub to accommodate a soap bar, and this is not suitable for a liquid soap dispenser. A similar alcove is found in most shower stalls, and here again there is no place for a liquid soap dispenser except on the floor of the stall.

In my above-identified copending patent application, there is disclosed a wall fixture assembly for adhesively mounting an object onto a wall. The assembly, though capable of supporting a relatively heavy load, is readily removable from the wall. The assembly is constituted by a base sheet and a fixture having a flat foot, the base sheet having an undersurface coated with a layer of pressure-sensitive adhesive whereby the sheet may be pressed against the wall to conform thereto. The flat foot of the fixture, whose area is smaller than that of the sheet, is covered with a layer of high strength adhesive.

In installing this assembly on a wall, first the sheet is adhered to a selected site on the wall, after which the foot of the fixture is pressed against the sheet at the central zone thereof and firmly adhered thereto. A heavy load thereafter imposed on the fixture will not dislodge it from the wall, for the base sheet interposed between the fixture and the wall acts as a load distributor therefor. This adhesive mounting assembly obviates the need to bore holes in the wall, for it requires no anchoring screws or similar expedients, and it can easily be removed without marring the wall surface by peeling off the base sheet.

SUMMARY OF INVENTION

In view of the foregoing, the main object of this invention is to provide a liquid soap dispenser which is integrated with a wall mounting assembly, making it possible to securely anchor the dispenser on any convenient wall surface.

More particularly, it is an object of this invention to provide a dispenser and wall mounting assembly of the above type which is operable to supply a charge of liquid soap simply by pressing the flexible container.

A significant feature of the invention resides in the use of a liquid soap container having a pivoted spigot which, when the container is stored, is folded in to seal the contents; and which, when a container is wall mounted, is folded out to permit the immediate discharge of liquid soap when the container is pressed, there being no need to thereafter fold in the spigot.

Also an object of the invention is to provide a low-cost disposable liquid soap dispenser and wall mounting assembly which operates efficiently to supply liquid soap on demand, the assembly being readily removable from the wall when the supply is exhausted.

An important aspect of the invention resides in the fact that the base sheet of the assembly, which makes intimate contact with the wall at a site adjacent to a sink, bath tub, shower or other water outlet such as in a utility room, is readily peeled therefrom without in any way impairing the wall surface, so that while the adhesive bond between the liquid soap dispenser and the base sheet is extremely difficult to rupture, this difficulty does not apply to the bond between the base sheet and the wall.

Briefly stated, these objects are attained in a liquid soap dispenser having a container formed of flexible plastic material provided with a flat rear wall and an externally-threaded nipple projecting forwardly from the front wall adjacent the base, the nipple having a cap screwed thereon which incorporates a pivoted spigot that when folded in seals the nipple and when folded out creates an outlet from which liquid soap is discharged when the front wall is pressed.

Secured to the rear wall is a pad whose outer face has a layer of pressure-sensitive adhesive thereon. Also provided is a base sheet whose area is greater than that of the pad, the base sheet having an undersurface coating of pressure-sensitive adhesive, making it possible to adhere the sheet to a selected side on a wall, after which the pad is pressed against the sheet to firmly anchor the dispenser on the wall.

OUTLINE OF DRAWINGS

For a better understanding of the invention as well as other objects and further features thereof, reference is made to the following detailed description to be read in conjunction with the accompanying drawings, wherein.

DESCRIPTION OF INVENTION

Figure 1:
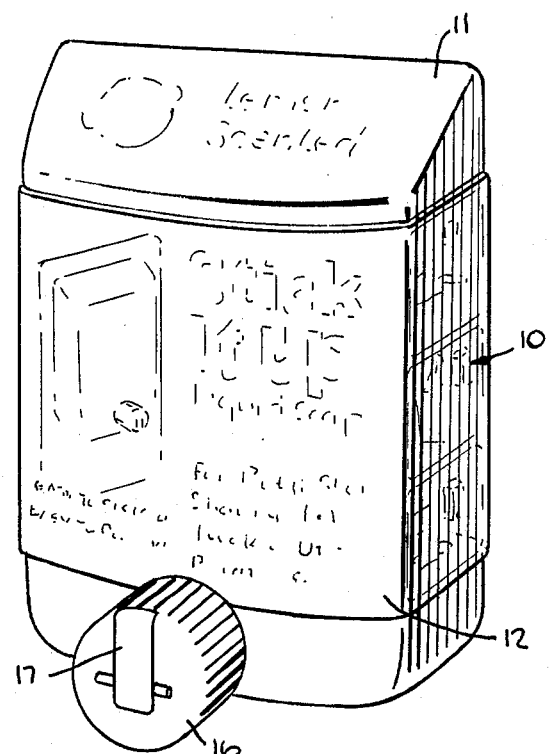
FIG. 1 is a perspective view of a liquid soap dispenser in accordance with the invention.

Referring now to the figures, there is shown a liquid soap dispenser in accordance with the invention, the dispenser including a container 10 having a generally rectangular cross section. The container has a sloped top wall 11 to permit water run-off when the dispenser is installed in a shower stall, a flat front wall 12, a parallel flat rear wall 13 and a base 14 at right angles to the front and rear walls so that the container stands in an upright position on a horizontal surface or in a shipping box.

Projecting forwardly from the center of the front wall at its junction with the base is an externally threaded nipple 15 which is integral with the container. The container and nipple are molded of a suitable flexible plastic material such as polyethylene or polypropylene.

Figure 3:
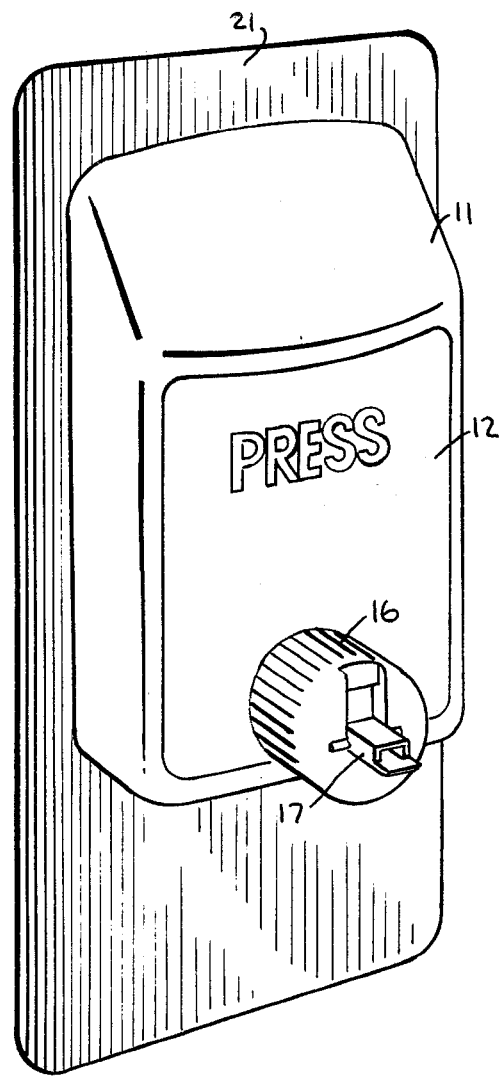
FIG. 3 shows the wall-mounted dispenser in its operative condition.

Screwed onto nipple 15 is a knurled cap 16 provided with a pivoted spigot 17, the spigot arrangement being such that when it is folded into the cap, it seals the liquid soap 18 which fills the container, as shown in FIG. 1. When, however, the spigot is folded out to create an outlet, as shown in FIG. 3, the nipple is unsealed and when a pressure is then exerted on front wall 12 by the user, this will cause the discharge of liquid soap from the outlet.

Containers having a threaded nipple and a similar screw-on cap are in common commercial use and may be found, for example, on the top of flexible shampoo bottles. But in the conventional bottle arrangement, in order to discharge the shampoo or whatever other liquid is being contained, one must tilt the bottle to cause the liquid to enter the nipple. One cannot eject the liquid in an upward path, for the liquid in the container, if vertically held, will be below the level of the nipple.

Figure 2:
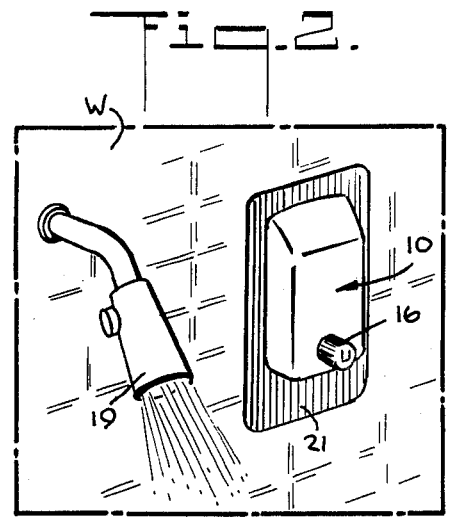
FIG. 2 illustrates the dispenser when mounted by a mounting assembly on the tiled wall of a shower stall.
Figure 4:
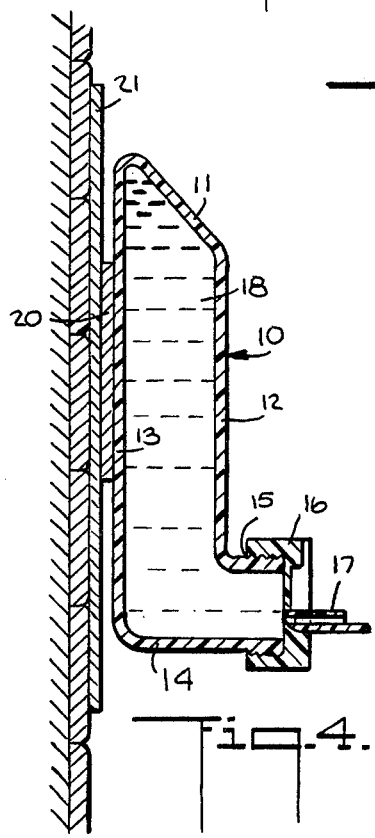
FIG. 4 is a sectional view of the dispenser and its mounting.

In the present arrangement, when the container is mounted on a wall W, as is shown in FIG. 2 where the wall is in a shower stall provided with a shower head 19, there is no need to tilt the container, for the nipple is at right angles to the front wall of the container at the bottom thereof and the discharge of liquid is in a horizontal path, the nipple always being supplied with liquid soap until such time as the container is exhausted.

Pressure applied by the user to the front wall reduces the internal volume of the container and applies a pressure to the liquid soap therein causing its discharge. But when the pressure is released, the front wall reverts to its normal position thereby creating a negative pressure in the container causing it to suck in the liquid soap from the spigot. Even though the spigot remains open, once the dispenser is installed, the soap has sufficient viscosity to prevent gravity flow through the duct of the open spigot.

In order to mount the dispenser on wall W, attached to the rear wall 13 of the container is a pad 20, preferably in the form of a double-faced, pressure-sensitive adhesive pad of the type marketed commercially by 3M Company. This pad is formed of flexible foam plastic material having an adhesive inner face which is adhered to the rear wall of the container and an adhesive outer face protected by a peel-off liner. The pressure-sensitive adhesive used in this pad is of high strength.

Also provided is a rectangular base sheet 21 of flexible plastic film material such as polyvinyl chloride whose undersurface is coated with pressure-sensitive adhesive. The outer face of sheet 21 is smooth, and in practice may be printed with a decorative pattern. Suitable for this purpose is so-called "Contact-Paper" which is commercially available, the adhesive surface of the sheet being protected by a removable liner which is peeled off before the base sheet is applied to a wall surface. While a rectangular base sheet is shown, in practice it may be in other geometric forms, as long as its area relative to that of the pad is large.

Base sheet 21 is pressed against wall W at the selected installation site. When the dispenser is to be used near a kitchen sink, the sheet is applied on the wall next to the sink; whereas in a bathroom, it may be applied to the wall just above the faucets. Where the placement is made is determined by the site the user regards as most convenient for this purpose. After the base sheet is put on the wall, manual pressure is applied throughout its entire surface to ensure that this sheet adheres to and intimately conforms to the wall surface without any air bubbles therebetween.

After base sheet 21 is in place, the liner is peeled off pad 20, and the outer face of the pad is firmly pressed against the wall-applied base sheet at the central zone thereof, as best seen in FIG. 3. While the strength of the adhesive bond between the pad and the base sheet per unit area is greater than that between the base sheet and the wall surface because of the nature of the adhesives employed, inasmuch as base sheet 21 acts as a load distributor for the dispenser, the combination of a dispener adhered to a base sheet and a base sheet adhered to a wall is highly resistant to the load imposed on the mounting by the liquid soap dispenser. And though the adhesive contact between the base sheet and the wall surface is relatively weak per unit area, because this adhesive contact is spread over a large surface area in intimate conformity to the sheet, the base sheet is highly resistant to any applied shearing force.

When the supply of liquid soap has been exhausted, one simply peels off the base sheet in order to remove the dispenser from the wall, after which a fresh dispenser may be mounted on the same site.

While there has been shown and described a preferred embodiment of a Liquid Soap Dispenser and Adhesive Wall Mounting Assembly in accordance with the invention, it will be appreciated that many changes and modifications may be made therein without, however, departing from the essential spirit thereof. Thus instead of a dispenser which required pressure on the container to effect a discharge, a rigid container may be used in conjunction with a pump-type outlet on the front wall.

I claim:

1. A liquid soap dispenser and wall mounting assembly adapted to mount the dispenser on a wall in a manner whereby the dispenser is securely anchored thereon comprising:
  A. a wall container filled with liquid soap and having a flat rear wall to which is attached a pad having a high-strength per unit area pressure-sensitive adhesive on its outer face;
  B. an outlet projecting from the front face of the container adjacent the base thereof to discharge the liquid soap; and
  C. a flexible base sheet formed of plastic film material normally separated from said pad and having a larger area than that of the pad, said sheet having an undersurface coated with a relatively low-strength per unit area pressure-sensitive adhesive, making it possible to press the base sheet onto a selected site on a wall to adhere and conform thereto, after which the pad may be pressed against the outer face thereof to support the container from the wall, said base sheet acting as a load distributor for the container and being highly resistant to shearing forces, the dispenser upon exhaustion of the soap being removable from the wall simply by peeling the base sheet from the wall, said pad being a double-faced pad of pressure-sensitive material whose inner face adheres to said rear wall and whose outer face to said base sheet.

2. A liquid soap dispenser and assembly as set forth in claim 1, wherein said container has a sloped top wall to permit water run off.

3. A liquid soap dispenser and assembly as set forth in claim 1, wherein said outlet is constituted by an externally threaded nipple and a cap screwed thereon, said cap having a pivoted spigot which, when folded in, seals the container, and when folded out, provides a liquid soap outlet.

4. A dispenser and assembly as set forth in claim 1, wherein said pad is a double-faced pad of pressure-sensitive material whose inner face adheres to said rear wall and whose outer face to said base sheet.

5. An assembly as set forth in claim 4, wherein said outer face of the pad is protected by a removable liner.

* * * * *